United States Patent [19]
Hoffman

[11] 3,712,152
[45] Jan. 23, 1973

[54] GEAR UNIT OIL SEAL AND SUPPORT
[75] Inventor: Herbert N. Hoffman, Lunenburg, Mass.
[73] Assignee: General Electric Company
[22] Filed: Nov. 19, 1971
[21] Appl. No.: 200,306

[52] U.S. Cl. .............................................. 74/606 R
[51] Int. Cl. ............................................. F16h 57/02
[58] Field of Search......74/606 R; 277/180; 184/6.12

[56] References Cited

UNITED STATES PATENTS
2,955,857   10/1960   Smith .................................. 277/180
3,592,480   7/1971   Koranyi ........................... 277/180 X Primary Examiner—Milton Kaufman
Assistant Examiner—F. D. Shoemaker
Attorney—William C. Crutcher et al.

[57] ABSTRACT

An oil seal and support arrangement for mounting an open bottom gear casing over an open top oil chamber with a vapor and fluid tight seal including provision for adjusting the height of the chocks or shims under the support areas of the gear casing for correcting machinery realignment without disturbing the seal.

3 Claims, 4 Drawing Figures

PATENTED JAN 23 1973  3,712,152
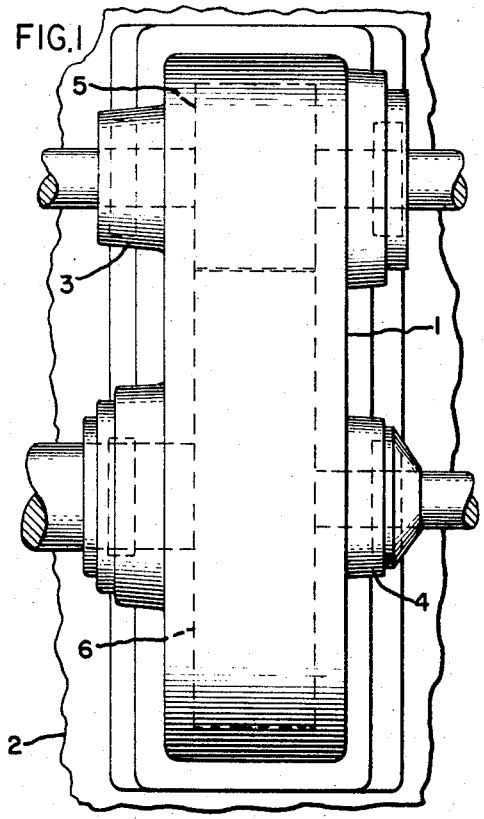
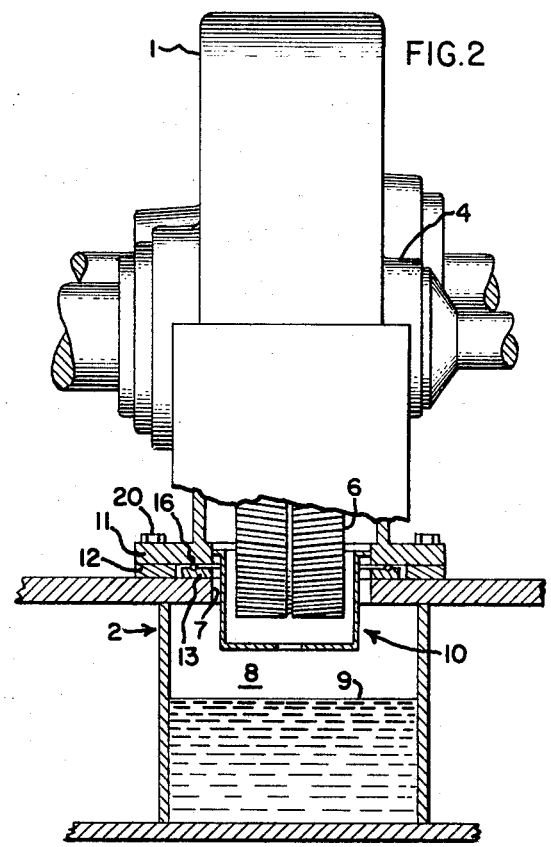
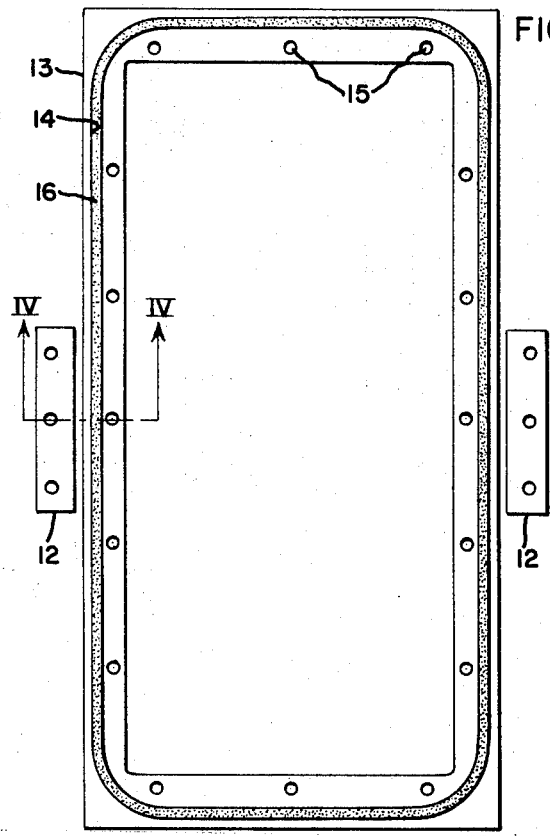
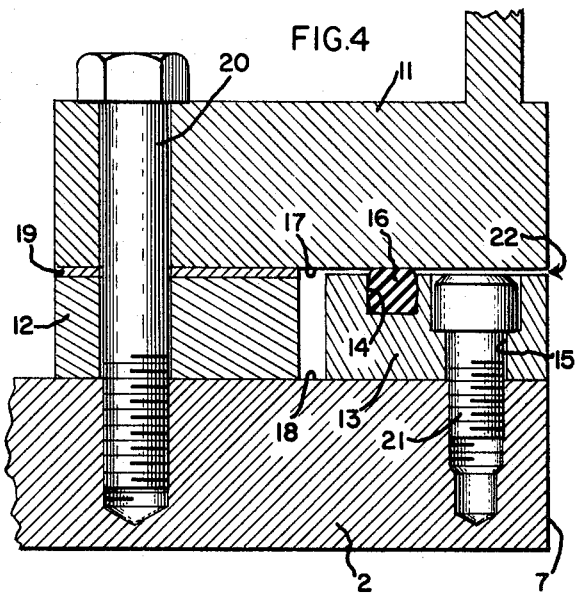

GEAR UNIT OIL SEAL AND SUPPORT

BACKGROUND OF THE INVENTION

This invention relates generally to a support arrangement for a sealed casing containing rotatable members subject to misalignment wherein the bottom of the casing is provided with a seal around an opening that mates with an opening in the supporting base structure. More particularly, the invention relates to an open bottom gear casing support with an improved sealing structure.

The optimum tooth contact of meshing gears inside a gear casing depends upon accurate alignment of the gear rotors which in turn is dependent upon an accurate relationship of the portions of the gear casing that support the gear rotors. If a gear casing is seated directly upon a base structure, machining tolerances may be such as to result in a strain being introduced into the gear casing, whereby optimum tooth contact may no longer exist. The same may result from a strain introduced into the base structure because of manufacturing tolerances between the seating surfaces of the base and the mating supporting surfaces of the foundation. The problem may be further aggravated on shipboard applications where changes may occur in the supporting structure for the machinery base between its condition when the ship's hull is on the building ways and when launched in the water. Hence, it is the practice to provide chocks or shims between the seating surfaces of the gear casing and the corresponding supporting surfaces of the machinery base so that adjustments can be made at these points to reestablish optimum tooth contact.

Problems are encountered where it is also desired to maintain an oil seal at the same interface between the gear casing and the base support, since shimming or local height adjustments tend to destroy the effectiveness of the seal. It has been known to use a resilient material between the bottom of the gear casing and the base structure. Due to difficulties in machining a groove for this resilient member in the large base structure, past practice has been to use a groove in the underside of the gear casing. This is a costly arrangement since the gear casing is still a large unit which does not readily lend itself for machining the groove for the resilient member to the required accuracy by the most optimum machining facilities available. For effective sealing, it requires a very smooth surface on the large base structure at the seal contact area, a condition difficult to achieve. Leakage of oil or vapor beneath the resilient member and the base surface will exist if the groove and contact surface for the resilient member are not made to the required accuracy, particularly if height adjustments have to made under the supporting surfaces of the gear casing to establish gear tooth contact.

Accordingly, one object of the present invention is to provide an improved gear support structure with an oil seal which provides for limited subsequent height adjustment of the casing without reducing the effectiveness of the seal.

Another object of the invention is to provide an improved oil seal for an open bottom gear casing which reduces tendency towards leakage.

DRAWING

The subject matter which is regarded as the invention is particularly pointed out and distinctly claimed in the concluding portion in this specification. The invention, however, both as to organization and the method of practice, together with further objects and advantages thereof, may best be understood by reference to the following description taken in connection with the accompanying drawing, in which:

FIG. 1 is a plan view of a gear casing mounted on a base structure,

FIG. 2 is an elevation drawing, partly in section, of the gear casing and support, FIG. 3 is an enlarged plan view of the oil seal and frame, and FIG. 4 is an enlarged cross-section of the seal taken along lines IV—IV of FIG. 3.

SUMMARY OF THE INVENTION

Briefly stated, the invention is practiced by providing an open sealing frame in a space between a portion of the gear casing bottom flange and the base support, the spacing being maintained by rigid spacer blocks mounted between the gear casing bottom flange and the base support outside of the sealing frame. The frame incorporates a groove in its top surface containing a compressible resilient sealing member which projects above the top surface of the frame. The normal thickness of the spacer blocks is such that an appreciable amount of compression exists in the resilient sealing member and their thickness is greater than the thickness of the sealing frame, thus resulting in a sealing arrangement that can accommodate limited adjustment in the height of the spacer blocks that support the gear casing.

DESCRIPTION OF THE PREFERRED EMBODIMENT

Referring now to FIG. 1 of the drawing, a gear casing 1 is mounted on a base structure 2 and incorporates bearing housings 3, 4 for rotatably supporting gears inside the casing 1. The gears include a pinion 5 meshed with a low speed gear 6 in conventional fashion and the gears may suitably be of the "single helix" or the "double herring-bone" type.

Referring to the elevation view of FIG. 2, the supporting base 2 is seen to have an opening 7 into which gear 6 partially extends. Opening 7, which is only large as necessary to accommodate the bottom of gear 6, leads into a lower seal enclosure 8 which is an oil reservoir with oil maintained at a level 9, somewhat below surface on which the gear casing is mounted. A trough 10 with holes in the bottom surrounds the lower part of the gear wheel to prevent oil from splashing up and coming in contact with the gear rotor.

Gear casing 1 includes a lower support flange 11 which rests on solid spacer blocks or chocks 12 disposed directly beneath the pair of opposed bearing housings 4. Other spacer blocks (not shown) may also be placed beneath the pinion bearing housings 3 in similar manner. Disposed in the space between flange 11 and the base structure 2 inside the spacer blocks 12 and surrounding opening 7 is a sealing frame 13.

Referring now to FIG. 3 of the drawing, sealing frame 13 is seen to comprise an open rectangular framework having a continuous groove 14 in its upper surface. Groove 14 is formed with a generous radius at the corners of the frame and extends on the outside of spaced holes 15. A compressible "o-ring" sealing member 16 is disposed in groove 14 in a manner which will be seen more clearly by reference to FIG. 4 of the drawing.

The cross-section of FIG. 4 shows that the rigid spacer blocks 12 are disposed between flange 11 and base 2 so as to separate the respective opposed flat surfaces 17, 18. During subsequent adjustments when increased heights are desired, shims 19 may be inserted as indicated in FIG. 4. Bolts 20 secure the casing rigidly to the base 2.

The spacer frame 13 is of a selected lesser thickness than the nominal thickness of spacer blocks 12 and is secured to base 2 by means of bolts 21. As indicated in the drawing, the continuous compressible o-ring seal 16 is disposed in groove 14 and is compressed against the under surface of flange 11. The compressed o-ring bridges a selected clearance 22 between the spacer frame 13 and the underside 17 of the flange so as to prevent leakage of oil from between the flange and the frame 13.

OPERATION OF THE INVENTION

In operation, the gear casing lower flanges 11 are drawn tightly against the spacer blocks 12 and any factory installed shims by means of bolts 20 so as to compress the o-ring 16 into groove 14, thereby forming a seal. Subsequently during alignment of the gear casing, local placement of other shims 19 or reduction of the thickness of some of the spacer blocks in order to accomplish optimum tooth contact of the gear rotors will change the spacing 22 between surfaces 17, 18 in some locations. O-ring 16 will expand or be compressed so as to maintain the seal. Since the spacer blocks 12 are located on the outside of the frame 13, they may thus be removed and replaced without disturbing the oil seal. Also, since the spacer blocks are disposed substantially beneath the bearing housings 4, any forces or shocks transmitted between the base and the gear casing will be transmitted through the spacer blocks 12 and will not be communicated directly to the sealing ring 16 so as to reduce its effectiveness.

While there has been shown what is considered at present to be the preferred embodiment of the invention, it is of course understood that various other modifications may be made therein, and it is intended to cover in the appended claims all such modifications as fall within the true spirit and scope of the invention.

What is claimed is:

1. A seal gear support comprising:
    a base structure defining an opening therein and having flat seating surfaces surrounding said opening,
    a casing having at least a pair of opposed bearing housings for supporting a gear member above said opening, said casing including a bottom support flange having flat surfaces uniformly spaced from said base seating surfaces,
    rigid spacing means including a plurality of replaceable spacer blocks tightly engaged between said surfaces and disposed substantially beneath said bearing housings,
    a sealing frame surrounding said opening inside of said spacing means and disposed between said flange and base structure and being of lesser thickness than said spacing means, said frame defining a continuous contoured groove facing said flange surfaces, and
    a sealing member of resilient material compressed in said groove and resiliently engaging said flange surfaces.

2. The combination according to claim 1, wherein said casing includes a second pair of spaced bearing housings supporting a pinion gear meshing with said gear member, said spacing means also being disposed substantially below said second pair of bearing housings.

3. The combination according to claim 1 wherein said opening and said sealing frame are substantially rectangular and wherein said gear member extends partially through said frame and said opening, said groove being defined in the upper face of the frame and forming large radius curves at the corners.

* * * * *